(12) United States Patent
Pattichis et al.

(10) Patent No.: US 11,593,907 B2
(45) Date of Patent: Feb. 28, 2023

(54) SYSTEM AND METHODS FOR COMPUTING 2-D CONVOLUTIONS AND CROSS-CORRELATIONS

(71) Applicant: UNM Rainforest Innovations, Albuquerque, NM (US)

(72) Inventors: Marios Stephanou Pattichis, Albuquerque, NM (US); Cesar Carranza, Miami Beach, FL (US); Daniel Llamocca Obregon, Clawson, MI (US)

(*) Notice: Subject to any disclaimer, the term of this patent is extended or adjusted under 35 U.S.C. 154(b) by 239 days.

(21) Appl. No.: 17/038,816

(22) Filed: Sep. 30, 2020

(65) Prior Publication Data

US 2021/0065328 A1 Mar. 4, 2021

Related U.S. Application Data

(63) Continuation of application No. 15/780,052, filed as application No. PCT/US2016/067102 on Dec. 16, 2016, now Pat. No. 10,810,696.

(60) Provisional application No. 62/268,491, filed on Dec. 16, 2015.

(51) Int. Cl.
*G06T 1/20* (2006.01)
*G06F 17/15* (2006.01)
*G06V 10/50* (2022.01)
*G06V 10/42* (2022.01)
*G06V 10/94* (2022.01)

(52) U.S. Cl.
CPC ............. *G06T 1/20* (2013.01); *G06F 17/153* (2013.01); *G06V 10/431* (2022.01); *G06V 10/50* (2022.01); *G06V 10/955* (2022.01); *G06T 2210/52* (2013.01)

(58) Field of Classification Search
None
See application file for complete search history.

(56) References Cited

U.S. PATENT DOCUMENTS

| | | | |
|---|---|---|---|
| 9,674,530 B1* | 6/2017 | Bultje | H04N 19/157 |
| 2007/0183308 A1 | 8/2007 | Korobkov et al. | |
| 2008/0097730 A1* | 4/2008 | Canning | G06F 30/367 |
| | | | 703/2 |
| 2013/0088489 A1* | 4/2013 | Schmeitz | G06T 15/00 |
| | | | 345/419 |
| 2014/0050415 A1* | 2/2014 | Sims | G06T 5/002 |
| | | | 708/277 |
| 2014/0219579 A1 | 8/2014 | Lischinski et al. | |
| 2017/0300372 A1* | 10/2017 | Andreopoulos | G06F 11/0706 |

FOREIGN PATENT DOCUMENTS

WO 2015095064 6/2015

* cited by examiner

*Primary Examiner* — Leon Viet Q Nguyen
(74) *Attorney, Agent, or Firm* — Valauskas Corder LLC

(57) ABSTRACT

Fast and scalable architectures and methods adaptable to available resources, that (1) compute 2-D convolutions using 1-D convolutions, (2) provide fast transposition and accumulation of results for computing fast cross-correlations or 2-D convolutions, and (3) provide parallel computations using pipelined 1-D convolvers. Additionally, fast and scalable architectures and methods that compute 2-D linear convolutions using Discrete Periodic Radon Transforms (DPRTs) including the use of scalable DPRT, Fast DPRT, and fast 1-D convolutions.

6 Claims, 18 Drawing Sheets

1: Parallel load $G = G_m$, flipped load $H = \mathring{H}_m$
2: for $d = N - 1$ downto $0$ do
3:     Parallel mult. $P(k) = G(k)H(k)$, $0 \leq k \leq N - 1$.
4:     Parallel add $F(d) = \sum_{k=0}^{N-1} P(k)$
5:     CRS by one $H = H^1$
6: end for
7: Parallel output $F$ ▷ For cross-correlation, apply:
▷    Flip (h) and store
▷    the flipped version in memory.
1: Precompute/Compute
   $H = \text{DPRT}\{\text{ZeroPad}\{h\}\}$
   and store the results in memory.
2: Compute $G = \text{DPRT}\{\text{ZeroPad}\{g\}\}$
3: for $p = 0$ to $L - 1$ do
4:    Compute $J$ directions in parallel:
      $F_{pJ+i} = G_{pJ+i} \otimes H_{pJ+i}$,    for $i = 0, \ldots, J - 1$.
5: end for
6: Compute $f = \text{DPRT}^{-1}\{F\}$

FIG. 5

1: procedure Tree_Resources_WIB($N, D$)
2:     $n = \lceil \log_2 N \rceil$
3:     $A_{ffb} = A_{FA} = 0$
4:     $a = N$
5:     for $z = 1$ to $n$ do
6:         $r = \langle a \rangle_2$
7:         $a = \lfloor a/2 \rfloor$
8:         $A_{FA} = A_{FA} + a \cdot (D + z - 1)$
9:         $a = a + r$
10:        $A_{ffb} = A_{ffb} + a \cdot (D + z)$
11:     end for
12:     $A_{ffb} = A_{ffb} + X \cdot D$     ▷ With Input Buffers (WIB)
13:     return $A_{FA}, A_{ffb}$
14: end procedure

FIG. 8

| Method | Clock Cycles | Flip-flops (regs for FFTr2) | Additions | Multipliers | Memory |
|---|---|---|---|---|---|
| *FastConv* Proposed Fast Conv. (fixed point) | $6N+5n+17$ | $(N+1)(36N+A_{ffb}(N,12))$ $+N(8N+A_{ff}(N,8))$ $+12N^2+(N+1)\cdot A_{FA}(N,12)$ $+N(12+n)$ | $(N+1)\cdot A_{FA}(N,12)$ $+N\cdot A_{FA}(N,8)$ $+(N+1)A_{FA}(N,12)$ $+N(12+n)$ 1-bit adds | $(N+1)N$ 12-bit fixed point mults | Ker: $12N(N+1)$ |
| *FastXCorr* | Same as for *FastConv*. *FastXCorr* flips kernel prior to DPRT computations. | | | | |
| *FastScaleConv* Proposed Scalable Convolution (fixed point) | $\square N/H_\square(N+3H+3)$ $+N+\square\log_2 H_\square+1$ $+\square(N+1)/J_\square\cdot(J+N)$ $+n+1$ $+\square N/H_\square(N+H)$ $+2\square\log_2 M_\square+\square\log_2 H_\square$ $+12+3$ | $J(36N+A_{ffb}(N,12))$ $+N(8H+A_{ff}(H,8))$ $+12N\cdot N$ $+(N+1)\cdot A_{ff}(H,12)$ | $J\cdot A_{FA}(N,12)$ $+N\cdot A_{FA}(H,8)+12N$ $+(N+1)\cdot A_{FA}(H,12)$ $+2N(12+n)$ 1-bit adds | $J\cdot N$ 12-bit fixed point mults | $24N(N+1)$ Ker: $12N(N+1)$ |
| *FastScaleXCorr* | Same as for *FastScaleConv*. *FastScaleXCorr* flips kernel prior to DPRT computations. | | | | |
| *FastRankConv* Proposed Fast SVD-LU (fixed point) | $r\cdot(J+N)(\square P/J_\square)$ $+\square N/J_\square)+p+1$ | $J\cdot(36P+A_{ffb}(P,12))$ | $J\cdot(A_{FA}(P,12)+12)$ 1-bit adds | $J\cdot P$ 12-bit fixed point mults | $8P^2$ $+12N(N+P)$ Ker: $24P^2$ |
| *FastRankXCorr* | Same as for *FastRankConv*. Kernel flipping implemented during pre-processing. | | | | |
| SerSys[14] (fixed point) | $N^2+2P-2$ | $4P^2+34P^2-10P-12$ | $12P(P+1)$ 1-bit adds | $P^2$ 12-bit fixed point mults | Ker: $12P^2$ |
| ScaSys[15] (fixed point) | $[N^2/P_A]+2P_A+P_B$ $+\square\log_2 P\cdot P_{A\square}$ | $P_A(20P^2+A_{ffb}(P_AP,12))$ $+8P(P_A^2+P_A-1)$ | $P_A(12P^2+A_{FA}(P_AP,12))$ 1-bit adds | $P_A P_A^2$ 12-bit fixed point mults | Ker: $12P_A\cdot P$ |
| SlWin[25] (fixed point) | $N\cdot P+N^2$ $+2\square\log_2 P_\square+1$ | $20P^2+A_{ffb}(P^2,12)$ | $A_{FA}(P^2,12)$ 1-bit adds | $P^2$ 12-bit fixed point mults | $8PN+8P^2+12N^2$ |
| FFT2[10] 32-bit floating-point | $5N^2+4N)/D$ | $D=2$: $(6N-8)$ 32-bit registers $D=4$: $(8N-16)$ 32-bit registers | $40D\cdot(\log_2 N+1)$ 32-bit floating point adders. | $2D\cdot(1+\log_2 N)$ 32-bit float point mults | $64N^2$ Ker: $32N^2$ |

FIG. 9

| SRAM | MEM_IN | MEM_KER | MEM_TMP | MEM_OUT |
|---|---|---|---|---|
| Quantity | $P2$ | $Q2$ | $P1$ | $P2+Q2-1$ |
| Depth | $P1$ | $2Q2$ | $P2+Q2-1$ | $P1+Q1-1$ |
| Wordlength | $B$ | $C$ | $B+C+q2$ | $B+2C+q1+q2+r$ |
| Function | $g$ | $h_R, h_C$ | $g'$ | $f$ |
| MODES | 1 | 1 | 0/1 | 0/1 |
| Orientation | Column | Column | Row | Column |
| WriteMode | Store | Store | Store | Accumulate |

FIG. 12

Implementations with linear running time, $J = 128$, $H = 127$, rank = 2 (FastRankConv), $P_A = 16$ (ScaSys).

| Method | Clock Cycles | Flip-flops | 1-bit Additions | Multipliers | Memory |
|---|---|---|---|---|---|
| FastConv | 810 (1×) | 1687442 (1×) | 548101 (1×) | 16256 (1×) | 195072 (1×) |
| FastRankConv | 1023 (1.26×) | 484632 (0.29×) | 96012 (0.18×) | 8128 (0.50×) | 422156 (2.16×) |
| FastScaleConv | 1195 (1.28×) | 1689601 (1.00×) | 552038 (1.01×) | 16256 (1.00×) | 585216 (1.39×) |
| ScaSys[15] | 1054 (1.30×) | 1645888 (0.98×) | 982848 (1.79×) | 65536 (4.03×) | 786432 (4.03×) |

Implementations with quadratic running time, $J = H = 4$, rank =2 (FastRankConv), $D = 4$ (FFTr2).

| Method | Clock Cycles | Flip-flops | 1-bit Additions | Multipliers | Memory |
|---|---|---|---|---|---|
| FastScaleConv | 13093 (1×) | 53888 (1×) | 20309 (1×) | 508 (1×) | 585216 (1×) |
| FastRankConv | 12583 (0.96×) | 15264 (0.28×) | 3024 (0.15×) | 256 (0.50×) | 422156 (0.72×) |
| SerSys[14] | 16255 (1.24×) | 1187188 (22×) | 49908 (2.46×) | 4096 (8.07×) | 49152 (0.08×) |
| FFTr2[10] | 20608 (1.57×) | 33256 (0.62×) | 40960 (2.02×) | 640 (1.26×) | 1572864 (2.69×) |
| SliWin[25] | 24270 (1.85×) | 180212 (3.34×) | 49140 (2.42×) | 4096 (8.06×) | 291340 (0.50×) |

FIG. 15

Zynq-SoC

| N | Bits | LUTs | BRAMs | DSPs | Clks | J | H |
|---|---|---|---|---|---|---|---|
| 7 | 25 | 4209 | 21 | 7 | 212 | 1 | 2 |
| 17 | 31 | 15166 | 68 | 17 | 799 | 1 | 2 |
| 41 | 34 | 47271 | 205 | 41 | 3817 | 1 | 2 |
| 41 | 34 | 225124 | 205 | 328 | 1094 | 8 | 8 |
| 97 | 37 | 202925 | 485 | 97 | 19811 | 1 | 2 |
| 109 | 37 | 239084 | 545 | 109 | 24869 | 1 | 2 |
| 113 | 37 | 241106 | 565 | 113 | 26683 | 1 | 2 |

Virtex-7

| N | Bits | LUTs | BRAMs | DSPs | Clks | J | H |
|---|---|---|---|---|---|---|---|
| 7 | 25 | 4125 | 21 | 7 | 212 | 1 | 2 |
| 17 | 31 | 14950 | 68 | 17 | 799 | 1 | 2 |
| *37* | *34* | *662352* | *185* | *1406* | *291* | *38* | *,* |
| 41 | 34 | 46771 | 205 | 41 | 3817 | 1 | 2 |
| 41 | 34 | 617505 | 205 | 1312 | 658 | 32 | 32 |
| 127 | 37 | 321580 | 635 | 127 | 33536 | 1 | 2 |

FIG. 16

| P | Bits | LUTs | BRAMs | DSPs | Clks | J |
|---|---|---|---|---|---|---|
| 7 | 31 | 1165 | 24 | 7 | 564 | 1 |
| 7 | 31 | 8859 | 24 | 49 | 124 | 7 |
| 17 | 35 | 3219 | 92 | 17 | 3406 | 1 |
| 17 | 35 | 59326 | 92 | 289 | 306 | 17 |
| 31 | 35 | 5737 | 169 | 31 | 11414 | 1 |
| 31 | 35 | 180645 | 169 | 961 | 558 | 31 |
| 41 | 37 | 8014 | 224 | 41 | 20015 | 1 |
| 41 | 37 | 353629 | 224 | 1681 | 739 | 41 |
| 53 | 37 | 9593 | 290 | 53 | 33503 | 1 |
| 53 | 37 | 513647 | 290 | 2809 | 955 | 53 |
| 61 | 37 | 14065 | 334 | 61 | 44415 | 1 |
| 67 | 39 | 16205 | 367 | 67 | 48903 | 1 |

FIG. 17

SYSTEM AND METHODS FOR COMPUTING 2-D CONVOLUTIONS AND CROSS-CORRELATIONS

CROSS-REFERENCE TO RELATED APPLICATIONS

This application is a continuation of U.S. Application U.S. patent application Ser. No. 15/780,052 filed May 30, 2018, which is a U.S. National Application of International Application PCT/US2016/067102 filed Dec. 16, 2016, which claims the benefit of U.S. Provisional Application No. 62/268,491 filed on Dec. 16, 2015, incorporated by reference in its entirety.

STATEMENT FEDERALLY SPONSORED RESEARCH OR DEVELOPMENT

This invention was made with government support under CNS-1422031 awarded by National Science Foundation. The government has certain rights in the invention.

FIELD OF THE INVENTION

The invention relates generally to image and video processing. More specifically, the invention describes fast and scalable architectures for computing 2-D convolutions and 2-D cross-correlations using the Discrete Periodic Radon Transform (DPRT), 1-D convolutions, and related computer hardware architecture.

The following patents and patent applications are incorporated by reference: U.S. patent application Ser. No. 14/069,822 filed Nov. 1, 2013, now U.S. Pat. No. 9,111,059; U.S. patent application Ser. No. 14/791,627 filed Jul. 6, 2015; and International Patent Application PCT/US14/70371 filed Dec. 15, 2014, now U.S. patent application Ser. No. 15/103,977.

BACKGROUND OF THE INVENTION

There is a strong demand for computer systems to process digital images and videos. Many image and video processing methods require the fast execution of 2-D convolutions and cross-correlations to operate efficiently. The fast execution of 2-D convolutions and cross-correlations is needed for efficient, real-time computing systems as well as for processing collections of images and videos offline.

The current invention relates to embedded systems, desktops, or heterogeneous compute nodes that are parts of a cloud computing system, that include field-programmable gate array(s) (FPGA), programmable system(s) on a chip (PSoC), or custom-built architecture implementations of the methods described in this document. The invention describes the hardware and software that can be implemented in FPGAs or custom-built hardware to implement 2-D convolutions and cross-correlations. The invention provides resource scalability so that the user or computing system can select the hardware/software combination that fits within the resources of a particular FPGA or be implemented with different device technologies.

Fast and scalable architectures are desired to support implementation in modern devices such as FPGAs and PSoCs to provide efficient use of hardware resources delivering the best possible performance as well as fitted within available resources. The performance of most image processing systems is directly affected by the speed at which the 2-D convolutions can be performed.

Convolutions and cross-correlations have wide applications in image and video processing and imaging. The development of effective architectures and algorithms for computing convolutions and cross-correlations can be used in several applications (e.g., feature extraction, template matching, pattern recognition, edge detection, filtering, deconvolution, segmentation, and denoising).

A standard approach for developing efficient architectures for 2-D convolutions and cross-correlations would be to build the systems based on 2-D FFTs. As is well-known, for sufficiently large kernels, the use of 2-D FFTs provides better results than direct approaches. Unfortunately, the direct implementation of 2-D FFTs in hardware requires the use of complex, ideally floating-point, arithmetic units. As a result, the hardware scalability of using 2-D FFTs is fundamentally limited by the number of 1-D FFT processors that can be fitted in any given hardware device.

Alternatively, two-dimensional convolutions and cross-correlations can also be computed in the transform domain using the 2-D Discrete Periodic Radon Transform (DPRT). The DPRT can be computed using summations along different directions. Similar to the FFT, the DPRT approach first requires the DPRT of the image and the 2-D kernel. Then, along each DPRT direction, 1-D circular convolutions/cross-correlations between the DPRTs of the image and the 2-D kernel are computed. The 2-D convolution/cross-correlation result can then be computed by taking the inverse DPRT of the previous result. Unlike the 2-D FFT approach, the DPRT can be implemented with fixed-point additions.

The invention describes fast and scalable fixed-point hardware architectures that can compute 2-D convolutions and cross-correlations between a P×P image block and a P×P kernel in 0(P) to 0(P$^2$) clock cycles depending on available hardware resources. There is a demand for fast and scalable architectures and methods for computing 2-D convolutions and cross-correlations as well as those that fit in new devices. The invention satisfies this demand.

SUMMARY OF THE INVENTION

The invention introduces fast and scalable architectures and methods for convolution and cross-correlation. "Fast" refers to the requirement that the computation provides the result in a small number of cycles. "Scalable" refers to the requirement that the computation provides the fastest implementation based on the amounts of available resources.

The invention is directed to fast and scalable architectures and methods adaptable to available resources, that (1) computes 2-D convolutions using 1-D convolutions, (2) provides fast transposition and accumulation of results for computing fast cross-correlations or 2-D convolutions, (3) provides a parallel and pipelined 1-D convolver. Additionally, the fast and scalable architectures and methods can compute fast and scalable 2-D linear convolutions using a Discrete Periodic Radon Transform (DPRT) including scalable DPRT and Fast DPRT.

More specifically, for purposes of the invention, FastConv and FastXCorr are based on the fast DPRT and compute convolutions and cross-correlations, respectively, in 0(P), clock cycles, for image blocks and convolution blocks of size P×P. FastScaleConv and FastScaleXCorr are based on the scalable DPRT and can compute 2-D convolutions and cross-correlations in 0(P) to 0(P$^2$) clock cycles depending on available hardware resources. Furthermore, both approaches can use a sliding window extension (e.g., based on overlapand-add or overlap-and save) to compute 2-D convolutions and cross-correlations with much larger images.

FastRankConv uses separable approximations of non-separable kernels by expressing the non-separable kernels as a sum of a small number of separable 1-D kernels. Then, scalable hardware implementations can be derived by controlling the number of 1-D convolutions that are computed with the 1-D kernels.

As further detailed and described in International Patent Application PCT/US14/70371 filed Dec. 15, 2014, now U.S. patent application Ser. No. 15/103,977, a set of parallel algorithms and associated scalable architectures compute the forward and inverse DPRT of an N×N image that allows effective implementations based on different constraints on running time and resources. In terms of resources and running time, the scalable framework provides optimal configurations in the multi-objective sense. In terms of performance, the fastest architecture computes the DPRT in linear time (with respect to N). The architecture and methods are directed to forward and inverse DPRT and in particular, scalable and fast Discrete Periodic Radon Transform ("SFDPRT"), an inverse scalable and fast Discrete Periodic Radon Transform ("iSFDPRT"), fast Discrete Periodic Radon Transform ("FDPRT"), and inverse fast Discrete Periodic Radon Transform ("iFDPRT").

The scalable and fast framework may be implemented to compute convolutions and cross-correlations for relatively large image sizes (of the order of the image size). In terms of resources and running time, each solution (by itself) is optimal in the multi-objective sense. When the rank of the non-separable kernel is low, the framework based on the lower-upper (LU) decomposition becomes the optimal solution, and for high-rank kernels, the framework based on the DPRT is the optimal solution. In terms of performance, the fastest architecture based on the DPRT computes the 2-D linear convolution in linear time (with respect to N). And for low rank kernels, the fastest architecture based on the LU decomposition computes the 2-D linear convolution in linear time.

An advantage of the invention is performance scalability provided by controlling the number of row-processors in the DPRT and the 1-D convolutions/cross-correlations. For the DPRT framework, scalability comes from the control of the number of 1-D convolution kernels and the number of rows processed in parallel within the scalable DPRT or the inverse DPRT. For the LU framework, scalability comes from the separability of the kernels and its decomposition into low-rank 1-D kernels. For the fastest implementations, a throughput of N convolved pixels per clock cycle is achieved, such as by using N pipelined 1-D convolvers. The DPRT framework loads N pixels in a single clock cycle and computes one output pixel per clock cycle. The LU framework loads a complete row of pixels in a single clock cycle and computes one output pixel per clock cycle.

The invention also provides Pareto-optimal designs in the sense that the architectures provide the fastest implementations based on available resources. In other words, additional resources always yield faster performance. The 2-D convolutions and cross-correlations approaches are Pareto-optimal in terms of the required cycles and required resources. Thus, the scalable approach provides the fastest known implementations for the given computational resources. For each framework, a Pareto-front of optimal solutions is given for resources that fall within the fastest and the slowest running time. The invention improves upon current known approaches directed to large and non-separable kernels.

Another advantage of the invention is that the architectures and methods are not tied to any particular hardware. As an example, they may be implemented in an FPGA. FPGAs are an important and commonly used circuit element in conventional electronic systems. FPGAs are attractive for use in many designs in view of their low non-recurring engineering costs and rapid time to market. FPGA circuitry is also being increasingly integrated within other circuitry to provide a desired amount of programmable logic. Many applications can be implemented using FPGA devices without the need of fabricating a custom integrated circuit.

An advantage of the invention is that the image data is processed using an array of circular shift registers. Another advantage is that the memory is fast. The memory array may be implemented using a row of SRAMs where each SRAM stores a column of the image. Yet another advantage is row-level parallel I/O. The scalable architectures load the image into memory using a sequence of parallel loads of rows of pixels. Thus, for an image with N rows, the entire image can be loaded into memory in N cycles.

Another advantage of the invention is row-level parallel and pipelined processing. The scalable architectures process multiple rows at the same time. Thus, for FPGA implementations, the idea is to implement as many row-processing units as can fit in the device. Then, each row-processor uses a pipelined architecture that produces results after each cycle after an initial latency.

Another advantage of the invention is fast transpositions. The transposition overhead is significantly reduced using an additional output memory array. The output memory array uses dual-port memories to allow the writing of the output results and the reading of intermediate values at the same time. The invention permits read and write rows and columns in a single cycle as needed. Overall, the pipelined design provides a net effect that transposition is performed during computation and thus, does not require any additional cycles.

Yet another advantage is FastConv and FastXCorr compute convolutions and cross-correlations for for P×P blocks in O(P). For very large images (e.g., N>>P), the image can be broken into L separate blocks and use an overlap-and-add approach to compute the final results. Thus, in the fastest case, convolutions and cross-correlations can be computed in $O(L \cdot P)$ clock cycles. On the other hand, in the worst-case scenario, with very limited resources, 2-D convolutions and cross-correlations can be computed in $O(L \cdot P^2)$ clock cycles.

The invention is directed to a method for fast and scalable architectures adaptable to available resources, that can be used to compute 2-D convolutions using 1-D convolutions is performed by providing an input image and a 2-D convolution kernel and decomposing the 2-D convolution kernel into a sum of separable 1-D kernels. The 1-D kernels are applied along the rows and then columns or vice-versa. The results from the 1-D convolutions are added to produce the final approximation to the 2-D convolution kernel.

According to the invention, the 2-D decomposition of the 2-D convolution kernel and the number of separable 1-D kernels are computed using a combination of SVD and LU decompositions. Fast implementations of the method achieve a throughput of N convolved pixels per clock cycle, for example, by using N pipelined 1-D convolvers. It is contemplated that the input image is partitioned into blocks and processed using overlap-and-add or overlap-and-save.

The invention also provides a method for fast transposition and accumulation of results for computing fast cross-correlations or 2-D convolutions by allowing access, storage or accumulation of the results from a row or a column in a single clock cycle and accessing all or a portion of the results using one or more rows or one or more columns.

Additionally, the invention provides a method for a parallel and pipelined 1-D convolver by loading N pixels into a circular shift register in a single clock cycle, performing the multiplications with the convolution kernel in parallel in a single clock cycle, adding the multiplications results using a pipelined addition tree structure, for example pipelined with a latency of $\lceil \log_2(N) \rceil$ clock cycles. A circular right-shift is performed on the convolution kernel in a single cycle. The convolution result may be stored and the process repeats until all the convolution outputs have been computed. The steps of the method are performed in $N+\lceil \log_2(N) \rceil+2$ clock cycles including a throughput of 1 convolved pixel per clock cycle. According to the invention a 1-D convolver may be a circular convolver or a linear convolver. In certain embodiments of the invention, N pixels is a complete row of pixels.

The invention also is directed to a method for computing fast and scalable 2-D linear convolutions using a Discrete Periodic Radon Transform (DPRT). An input image is provided along with a convolution kernel. The DPRT of the convolution kernel is computed, or pre-computed, and stored in memory. The computation may be real-time according to certain embodiments of the invention. The DPRT of the input image is computed, wherein the input image or image block is of size $P_1 \times P_2$ with B bits per pixel. It is contemplated that the one or more DPRTs may be computed using a scalable DPRT, including using a fast DPRT. The method then computes in parallel one or more 1-D circular convolutions such as using the method for a parallel and pipelined 1-D convolver discussed above.

One or more image rows in a block of DPRT directions are processed in parallel. An inverse DPRT is applied and the final image outputted. It is contemplated that a first DPRT is of a zero padded input image and a second DPRT is of a zero padded convolution kernel for adaptive filterbank applications. The filterbank may consist of a single filter.

According to certain embodiments, the convolution kernel may be flipped along the rows and columns so that the computation of 2-D convolutions is equivalent to the computation of 2-D cross-correlations. Alternatively, the convolution kernel may be flipped along the rows, its DPRT pre-computed and stored in memory, so that the computation of 2-D convolutions is equivalent to the computation of 2-D cross-correlations.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention:

FIG. 5 illustrates the algorithm for computing the fast and scalable 2-D linear convolutions and cross-correlations according to the invention.

FIG. 8 illustrates the algorithm for computing the number of required adder tree resources as a function of the number of image samples (N) and bits per pixel (D) according to the invention. The algorithm gives the number of flip-flops in $A_{\textit{ffb}}$ and the number of full adders in $A_{FA}$.

FIG. 9 illustrates a comparison between the methods based on the invention: FastConv, FastXCorr (for cross-correlations), FastScaleConv, FastScaleXCorr (for cross-correlations), FastRankConv, and FastRankXCorr (for cross-correlations), and other methods. The input image and convolution blocks are of size P×P and the result image is of size N×N where N=2P−1 where P represents the input image and convolution kernel size. The parallel 1-D circular convolutions are denoted by $n=\lceil \log_2 N \rceil$, $p=\lceil \log_2 P \rceil$, J and H denotes the number of image rows that are processed in parallel by the DPRT. For $S_{CA}S_{YS}$, P needs to be a composite number and it is assumed to be given by $P=P_A \cdot P_B$. For $FFT_R 2$, D=2, 4 represents tehnubmer of 1-D FFT units running in parallel. It is defined that: (i) $A_{\textit{ffb}}(a, b)$ is the number of required flip-flops inside the a-operand of b bits adder tree including input buffers, (ii) $A_{\textit{ff}}()$ is the same number without accounting for input buffers, and (iii) $A_{FA}()$ is the equivalent number of 1-bit additions. As shown in FIG. 9, $A_{\textit{ffb}}(\cdot), A_{\textit{ff}}(\cdot), A_{FA}(\cdot)$ grow linearly as a function of N, and can be computed exactly using the algorithm of FIG. 8.

FIG. 12 illustrates a table of SRAM memory configurations for maximum accuracy according to the invention.

FIG. 15 illustrates a chart of performance and resource comparisons according to the invention for N=127 for 2-D convolutions between 64×64 blocks.

FIG. 16 illustrates a chart of the full precision implementation of FastScaleConv and FastConv on FPGAs according to the invention. FastConv is shown for N=37. Each DSP represents a multiplier and each BRAM represents up to 36 Kbits of SRAM.

FIG. 17 illustrates a chart of the full precision and scalable implementation of FastRankConv (rank=2) on a Virtex-7 FPGA according to the invention.

DETAILED DESCRIPTION OF THE INVENTION

The invention is directed to fast and scalable architectures and methods adaptable to available resources, that (1) compute 2-D convolutions using 1-D convolutions, (2) provide fast transposition and accumulation of results for computing fast cross-correlations or 2-D convolutions, (3) provide parallel computations using pipelined 1-D convolvers. Additionally, fast and scalable architectures and methods compute 2-D linear convolutions using a Discrete Periodic Radon Transforms (DPRTs) including the use of scalable DPRT, Fast DPRT, and fast 1-D convolutions.

The invention provides the following basic notation. Let $g(i,j)$ denote an image of $P_1$ rows with $P_2$ pixels per row be of size $P_1 \times P_2$ with B bits per pixel. The image $g(i,j)$ is indexed using $0 \le i \le P_1-1$ and $0 \le j \le P_2-1$. For the convolution kernels, the symbol h is used and assume a size of $Q_1 \times Q_2$ with C bits per pixel. f (i, j) is used for the output, with $N_1 \times N_2$ where $N_1 = P_1 + Q_1 - 1$ and $N_2 = P_2 + Q_2 - 1$. As described herein, N is simply used for the special case of $N_1 = N_2$ and similarly, P is used for $P_1 = P_2$.

To compute 1-D circular convolutions using circular shifts, $F_m(d)$, $G_m(d)$, $H_m(d)$ denote the DPRTs for f, g, h along the m-th prime direction. A special flip operation $\check{H}_m$ is defined by:

$$\check{H}_m(d) = H_m(N-1-d), d \ge 0$$

And the circular right-shift (CRS) by n using $\check{H}_m^n$ that is defined by:

$$\check{H}_m^n(d) = H_m(\langle d+n \rangle_N)$$

Then, the following shifted representation of the circular convolution is derived using:

$$F_m(d) = \sum_{k=0}^{N-1} G_m(k) H_m(\langle d+k \rangle_N)$$

$$= \sum_{k=0}^{N-1} G_m(k) H_m(\langle N-1-k+d+1 \rangle_N)$$

$$= \sum_{k=0}^{N-1} G_m(k) \check{H}_m^{d+1}(N-1-k)$$

$$= \sum_{k=0}^{N-1} G_m(k) \overline{\check{H}}_m^{d+1}(k)$$

Figure 1:
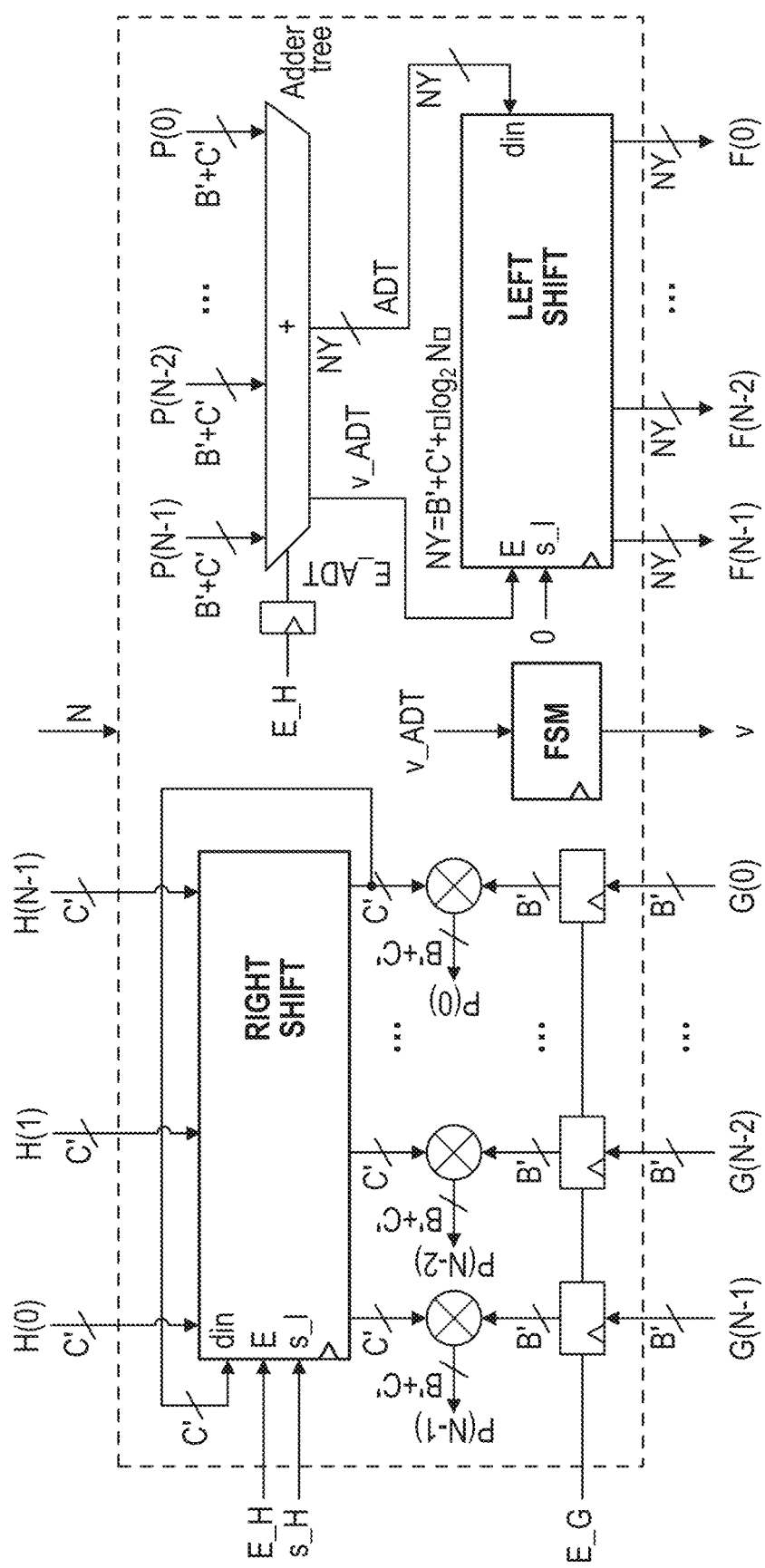
FIG. 1 illustrates an architecture for computing the fast 1-D circular convolution according to the invention.

As shown above, $F_m(d)$ can be expressed as the dot product between $G_m$ and a flipped and circular right-shifted by d+1 positions version of $H_m$ (denoted as $\check{H}_m^{d+1}$). A fast hardware implementation is derived. FIG. 1 illustrates an architecture for computing the fast 1-D circular convolution according to the invention. The 1-D circular convolution is expressed as $F_m = G_m \otimes H_m(d)$. As shown, B' and C' represent the number of input bits of H and G respectively.

Figures 2, 3:
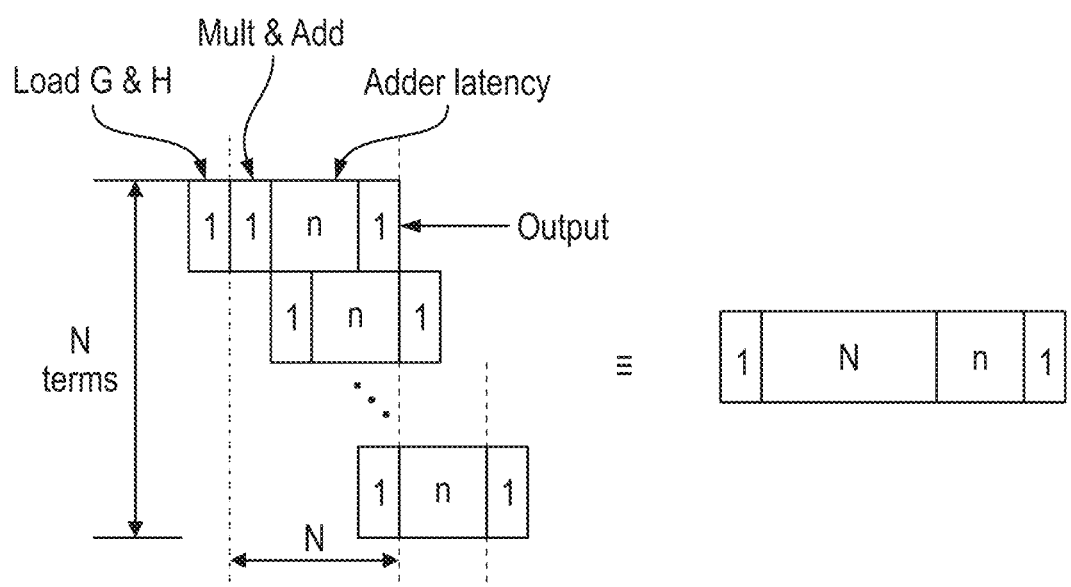
FIG. 2 illustrates the algorithm for computing the fast 1-D circular convolution according to the invention.
FIG. 3 illustrates the timing diagram for computing the fast 1-D circular convolution according to the invention.

FIG. 2 illustrates the algorithm for computing the fast 1-D circular convolution $F_m = G_m \otimes H_m(d)$. FIG. 3 illustrates the running time for the implementation of the fast architecture for computing one 1-D circular convolution. In this diagram, time increases to the right. The number of clock cycles for computing each term of $F_m(d)$ is shown on each strip. The strip on the right represents the total running time and $n = \lceil \log_2 N \rceil$ represents the addition latency.

According to the fast computation of 1-D circular convolutions given in FIG. 2, parallel loads are used to transfer both of the DPRTs to the G and H registers in a single clock cycle. Note that flipping $H_m$ into $\check{H}_m$ is performed by simply wiring the inputs in reverse as shown in the upper register portion of FIG. 1. Starting with the last convolution output, there is a 3-step sequence of parallel multiplies, addition of the results, and a circular right-shift to prepare for the next output, as shown by lines 3-5 of FIG. 2. The multiplications are performed in parallel in a single cycle using the parallel fixed-point multipliers of FIG. 1 and added using a pipelined tree structure in just $\lceil \log_2(N) \rceil$ clock cycles. The resulting outputs are left-shifted in, one output sample at a time, into the output F register shown in the lower-right portion of FIG. 1. A single cycle is also needed to perform the circular right-shift of H using the top-left register of FIG. 1. To derive the timing requirements, refer back to FIG. 3. Using a fully pipelined approach, the system and methods of the invention begin working on the next output sample after the parallel multiplies. It is easy to see that after the initial latency for the first sample, an output sample is computed at every cycle. After adding the latency for the initial loads, the adder latency, and the final left-shift, the total clock cycles is just $N + \lceil \log_2(N) \rceil + 2$.

The invention provides fast and scalable 2-D linear convolutions and cross-correlations using the DPRT. Below is a discussion of the architectures, algorithms, bit requirements, and computational efficiency for 2-D convolutions and cross-correlations. Most importantly, the scalability of the proposed approach allows for the most efficient implementations based on available resources.

Figure 4A:
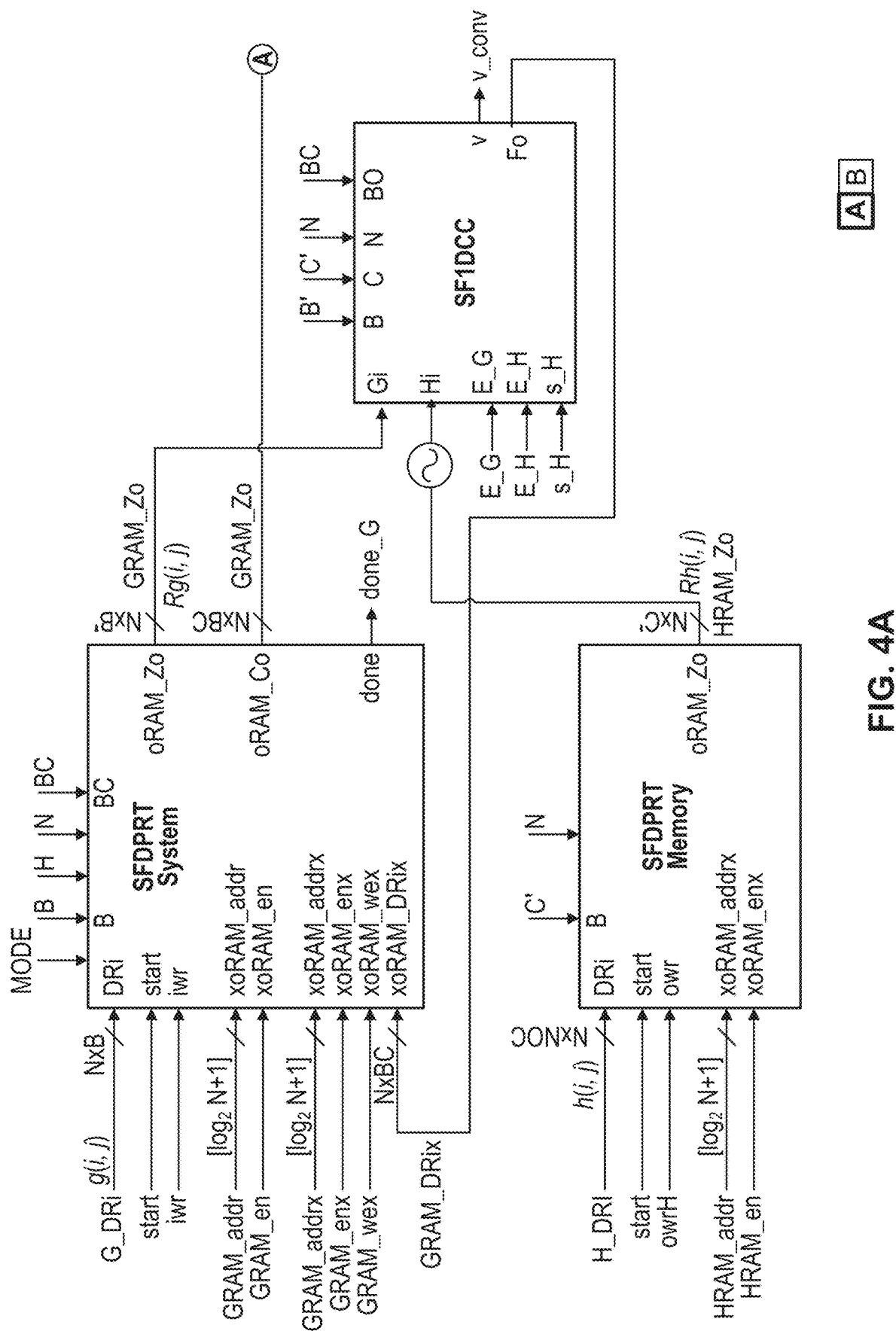
FIG. 4A illustrates a partial view of a basic architecture for computing the fast and scalable 2-D linear convolutions and cross-correlations using the Discrete Periodic Radon Transform (DPRT), specifically FastConv and FastScaleConv according to the invention.
Figure 4B:
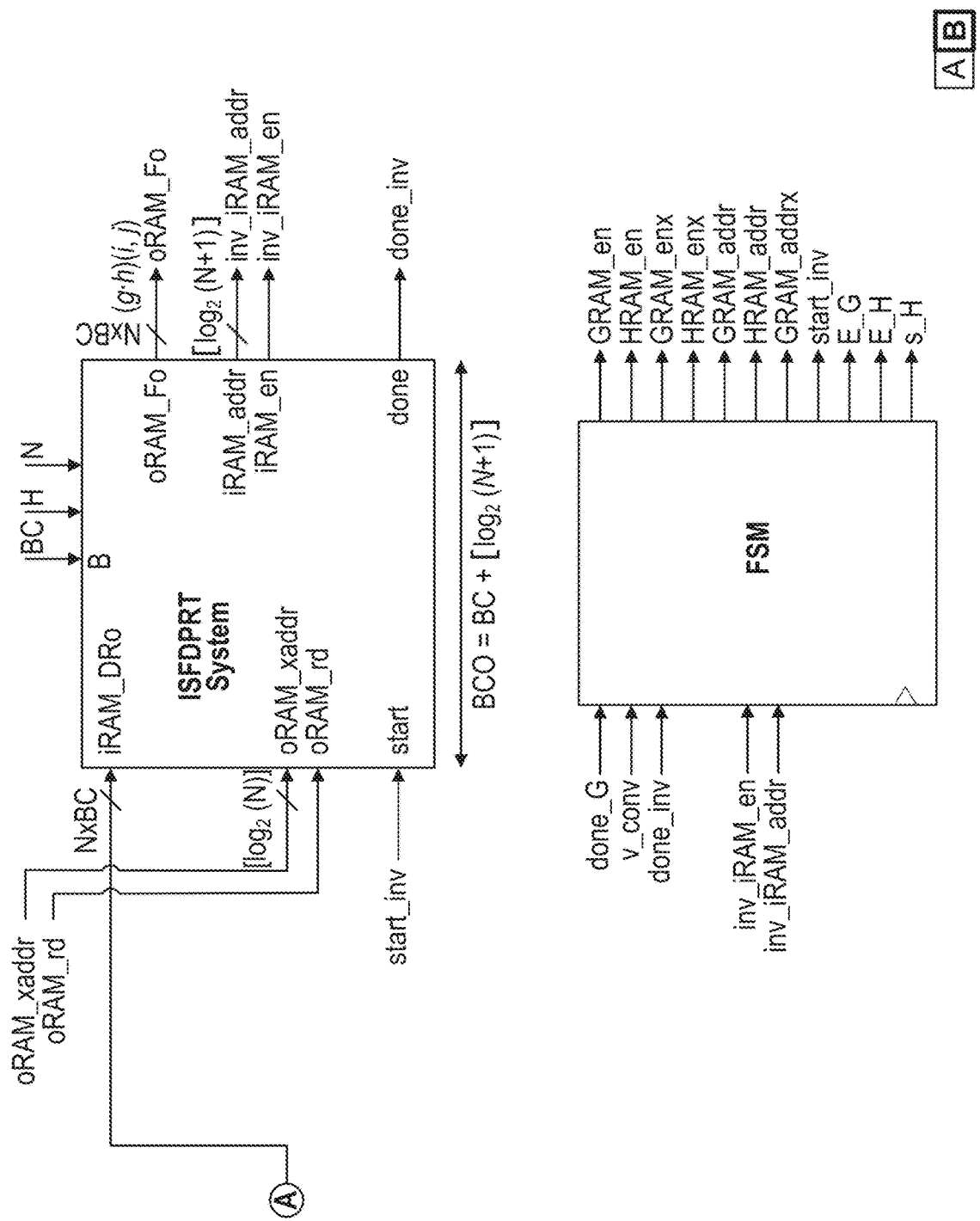
FIG. 4B illustrates a partial view of the basic architecture for computing the fast and scalable 2-D linear convolutions and cross-correlations using the Discrete Periodic Radon Transform (DPRT), specifically FastConv and FastScaleConv according to the invention.

FIG. 4A and FIG. 4B illustrate an architecture for computing the fast and scalable 2-D linear convolutions and cross-correlations according to the invention. More specifically, the architecture shown provides a unifying architecture for implementing FastScaleConv, FastScaleXCorr, FastConv, FastXCorr.

FIG. 5 illustrates the algorithm for computing the fast and scalable 2-D linear convolutions and cross-correlations between $g(i,j)$ and $h(i,j)$ using the architecture illustrated in FIG. 4A and FIG. 4B with $L = \lceil (N+1)/J \rceil$. In the most efficient implementation, the convolution kernel is available ahead of time. In this case, the DPRT of the kernel can be pre-computed and stored in memory as shown in the hardware architecture of FIG. 4A and FIG. 4B.

For adaptive filterbank applications, the DPRT of the zero-padded convolution kernel can be computed in real-time using the SFDPRT_System where the resulting DPRT is stored in (additional) memory. Alternatively, the SFDPRT_System component can be replicated for the kernel to avoid an increase of the running time. For computing cross-correlations, the vertical and horizontal flips associated with convolution need to be "undone" by flipping the kernel along rows and columns as described in FIG. 5. Here, the horizontal and vertical flips are performed by the SFDPRT_System component during the loading of the kernel.

An inverted MODE signal is used to control the SFDPRT_System to perform the needed flips. Vertical flips are implemented by switching the order of loading the rows. Thus, in a vertical flip, the last kernel row is loaded first and the first kernel row is loaded last. Horizontal flips are simply implemented by loading each row in reverse. Thus, in a horizontal flip, the last row element is loaded first and the first row element is loaded last. Overall, there is minimal overhead for implementing the horizontal and vertical flips.

Scalability is achieved by controlling (i) the number of 1-D circular convolutions that can be computed in parallel (denoted by J), and (ii) the number of image rows that can be processed in parallel in the DPRT blocks (denoted by H). Following the computation of the 1-D circular convolutions, an inverse DPRT is applied for computing the final result.

Bit requirements are also determined. Using the basic notation provided above, exact convolutions are computed to zero pad to a prime number requiring N=NextPrime(max ($P_1+Q_1-1$, $P_2+Q_2-1$). Therefore, the following is required (i) B+n bits for the DPRT of g, C+n bits for the DPRT of h where g uses B bits, h uses C bits, and n=$\lceil \log_2 N \rceil$, (ii) B+C+3n bits for the convolutions, and (iii) B+C+4n bits just before the normalization step of the inverse DPRT, and B+C+x bits for the final result, where x represents the additional bits used for precision after the division.

In deriving the computational complexity of the approach, scalable DPRT computation requires $\lceil N/H \rceil (N+3H+3)+N+\lceil \log_2 H \rceil +1$ clock cycles that reduce to $2N+\lceil \log_2 N \rceil +1$ clock cycles for the fast DPRT implementation. For computing the number of cycles required for the circular convolutions, refer to the timing diagrams for computing circular convolutions as shown in FIG. 6 and FIG. 7.

Figure 6:
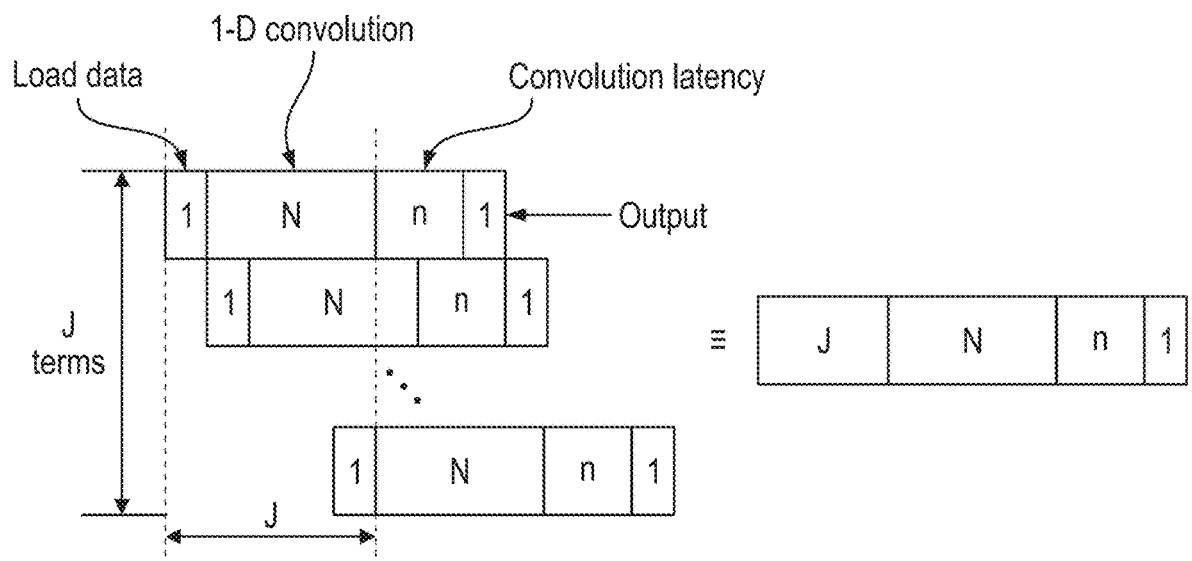
FIG. 6 illustrates the timing diagram for computing circular convolutions using J parallel convolution blocks according to the invention.
Figure 7:
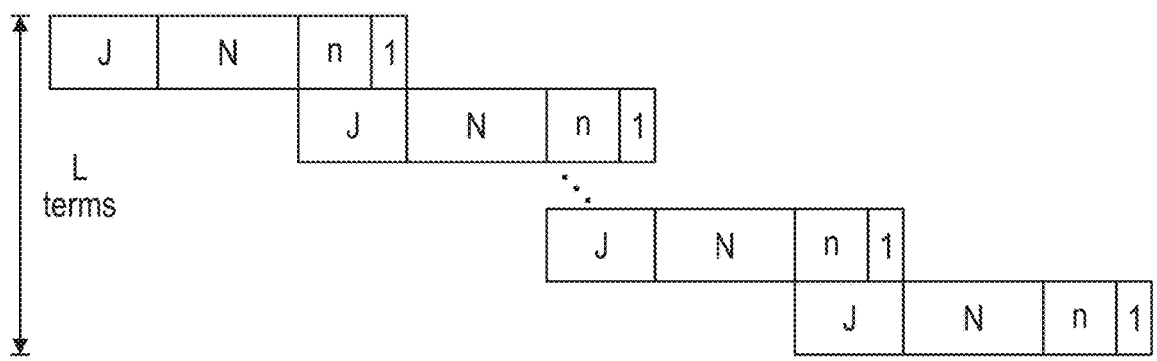
FIG. 7 illustrates the timing diagram for computing (N+1) circular convolutions using the J parallel convolution blocks given in FIG. 6 according to the invention.

As shown in FIG. 6, J+N+n+1 clock cycles are required to compute J convolutions in parallel where n=$\lceil \log_2 N \rceil$ represents the initial addition latency. To compute outputs for all the N+1 required DPRT directions, all J parallel blocks of 1-D convolutions are used for L=$\lceil (N+1)/J \rceil$ times. Depending on N, increasing J may not always provide for better solutions. Therefore, optimal values may be determined as described below with respect to Pareto optimal architectures. Overall, a total of L·(J+N)+n+1 clock cycles is required to compute all the 1-D convolutions.

A summary of the required resources for implementing the J 1-D parallel convolution blocks is now provided. Let the number of required flip-flops (including input buffers) that are needed for implementing the internal adders be denoted by $A_{\mathit{ffb}}$. Also, let the equivalent number of 1-bit full additions denoted by $A_{FA}$. The exact values for $A_{\mathit{ffb}}$ and $A_{FA}$ can be determined using the algorithm of FIG. 8.

FIG. 8 illustrates an algorithm of required tree resources as a function of the zero padded image (N), and the number of bits per pixel (D). To compute $A_{\mathit{ff}}$ for architectures that do not use input buffers, step 12 is simply removed from the algorithm. FIG. 9 provides for definitions of $A_{\mathit{ffb}}$ and $A_{FA}$. FIG. 9 provides comparison of the performance of 2-D convolution and cross-correlations architectures as a function of computational resources. The result is of size of N×N, where N=2P−1, P represents the input image size and convolution kernel size, n=$\lceil \log_2 N \rceil$, p=$\lceil \log_2 P \rceil$, J denotes the number of parallel 1-D circular convolutions, and H denotes the number of image rows that are processed in parallel by the DPRT.

It is defined that: (i) $A_{\mathit{ffb}}(a,b)$ is the number of required flip-flops inside the a-operand of b bits adder tree including input buffers, (ii) $A_{\mathit{ff}}()$ is the same number without accounting for input buffers, and (iii) $A_{FA}()$ is the equivalent number of 1-bit additions. As shown in FIG. 9, $A_{\mathit{ffb}}(\cdot)$, $A_{\mathit{ff}}(\cdot)$, $A_{FA}(\cdot)$ grow linearly as a function of N, and can be computed exactly using the algorithm of FIG. 8.

Returning to the required resources for implementing the J 1-D parallel convolution blocks, the required flip-flops is J·N·(2B+2C+5n)+J·$A_{\mathit{ffb}}$(N,B+C+2n), 1-bit full additions is J·$A_{FA}$(N,B+C+2n) and required multipliers is J·N. As noted above both $A_{\mathit{ffb}}(\cdot)$, $A_{FA}(\cdot)$ grow linearly.

Overall, based on the derived complexity, the invention provides the fastest running time using J=N+1 parallel 1-D convolutions at just 2N+n+2 clock cycles with resource usage of 0($N^2$) for flip-flops and full adders. For the minimum number of resources, only a J=1 1-D convolution block is used that require $(N+1)^2+n+1$ clock cycles with the lowest resource usage 0(N) for flip-flops and full adders.

Following the 1-D convolutions, the inverse DPRT is taken using the iSFDPRT_System component. Similar to the forward DPRT, scalability is controlled by H, the number of image rows processed in parallel. For this step, the input data uses B+C+3n bits per pixel. Depending on available resources, the inverse DPRT can be computed in just 2N+5n+B+C+2 for the fast inverse DPRT with 0($N^2$) resource usage (1-bit additions and flip-flops), or as slow as $$\left\lceil \frac{N}{2} \right\rceil (N+2)+4n+B+C+4$$

for H=2 for just 0(N) resource usage.

Turning to fast and scalable 2-D linear convolution using SVD-LU decompositions (FastRankConv), a collection of 1-D convolutions can be used, as described above, along the rows and columns to implement effective approximations to 2-D convolutions. Advantageously, the invention provides a fast and scalable system that eliminates the need for transpositions and allows the computation of convolutions in 0(N) to 0($N^2$) clock cycles.

As described above, scalability is achieved by controlling J, the number of linear convolutions that are computed in parallel. The linear convolution blocks are similar to the circular convolution blocks except that the complexity is a function of the size of the convolution kernel only (see FIG. 10A and FIG. 10B). Then, in order to operate as fast as possible, a custom memory system is designed that moves entire rows or columns to and from each linear convolver. Initially, all the rows are moved into the J convolution blocks, the convolution results stored in J SRAM memories so that the rows of the row-convolutions results correspond to the columns of the original image, and then row convolutions are performed and stored in J output SRAM memories. Thus, the need for the transpositions is completely avoided.

Figure 10A:
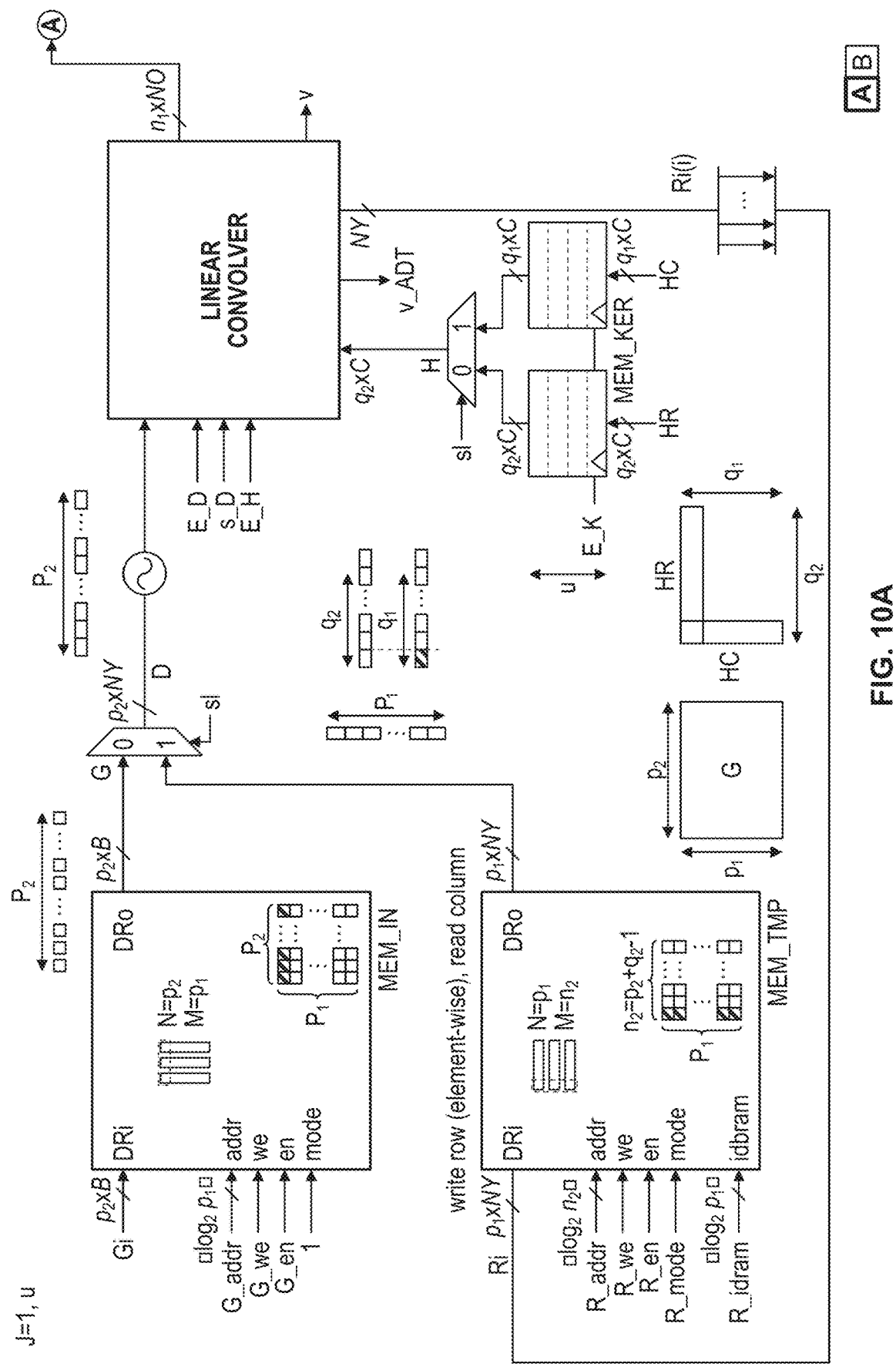
FIG. 10A illustrates a partial view of an architecture for computing fast and scalable 2-D convolutions using a sum of separable 1-D convolutions according to the invention (FastRankConv).
Figure 10B:
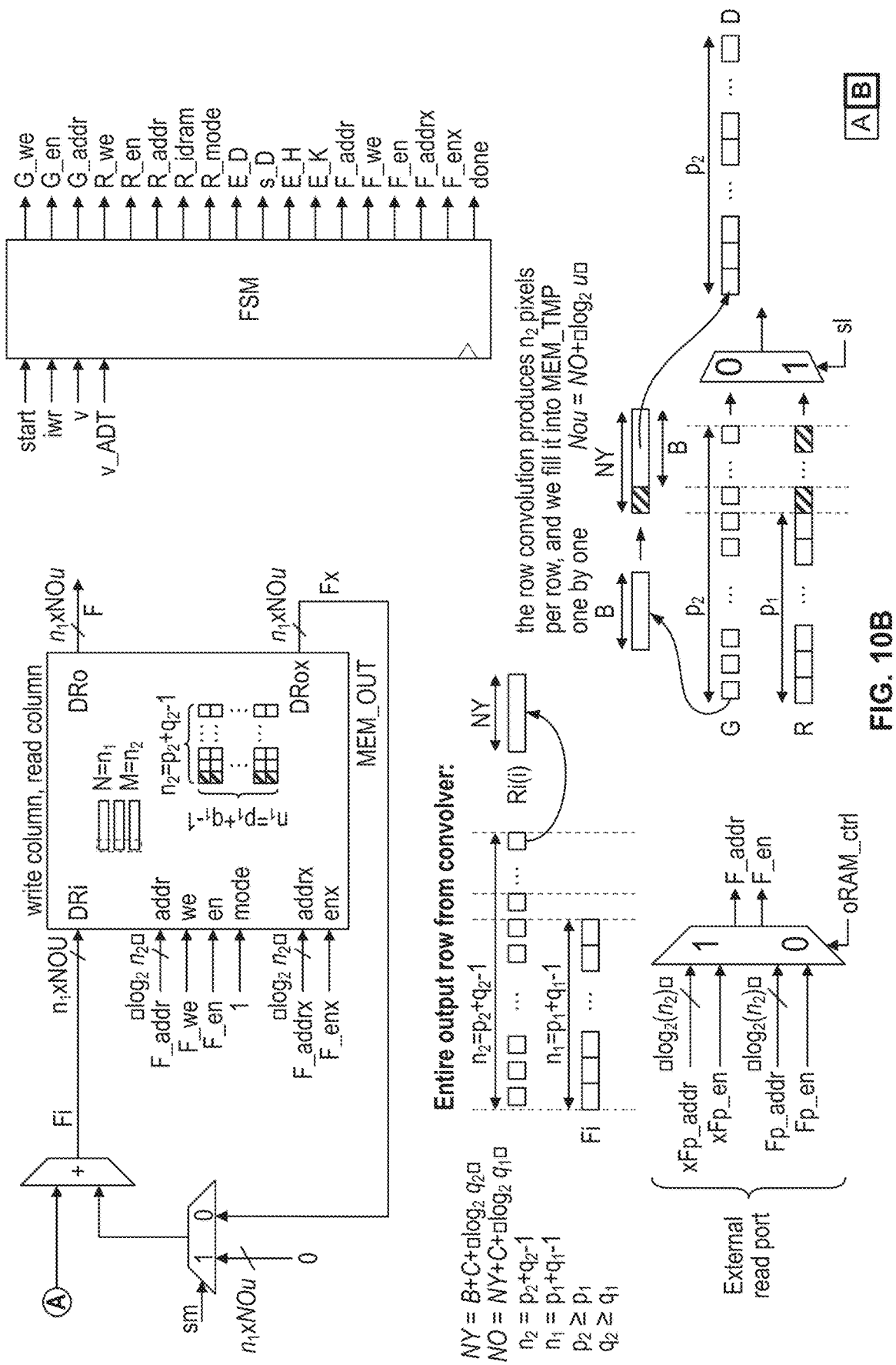
FIG. 10B illustrates a partial view of the architecture for computing fast and scalable 2-D convolutions using a sum of separable 1-D convolutions according to the invention (FastRankConv).

Then, for a single clock cycle, custom memories are used to (i) move entire rows and columns of pixels from memory to the convolution blocks and vice-versa, and (ii) allow direct access to J different SRAMs. The architecture is shown in FIG. 10A and FIG. 10B and the custom SRAM architecture shown in FIG. 11A and FIG. 11B. As shown in FIG. 10A and FIG. 10B, the fast and scalable 2-D convolutions are based on separable decomposition. Referring to the basic notation as provided above, the linear convolution blocks are very similar to the circular convolution blocks except that multiplications and additions are reduced to the size of the convolution kernel. Bus width is shown for maximum accuracy. Also, note that the implementation of FastRankCross is not considered here since cross-correlation is the same as convolution with a flipped kernel, and flipping can be computed during pre-processing (prior to SVD and LU).

Figure 11A:
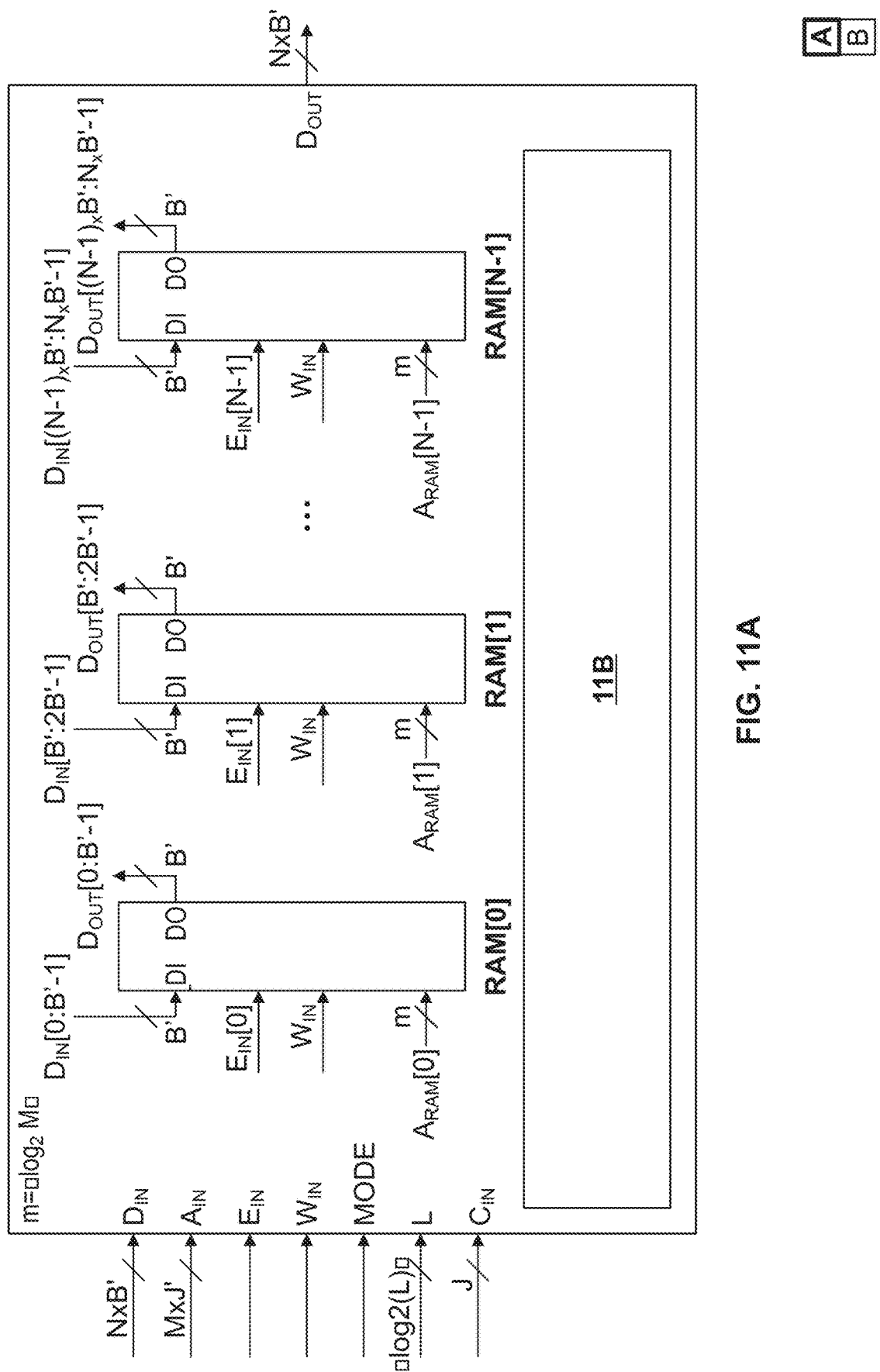
FIG. 11A illustrates a partial view of a custom SRAM architecture for fast transpositions and memory access according to the invention.
Figure 11B:
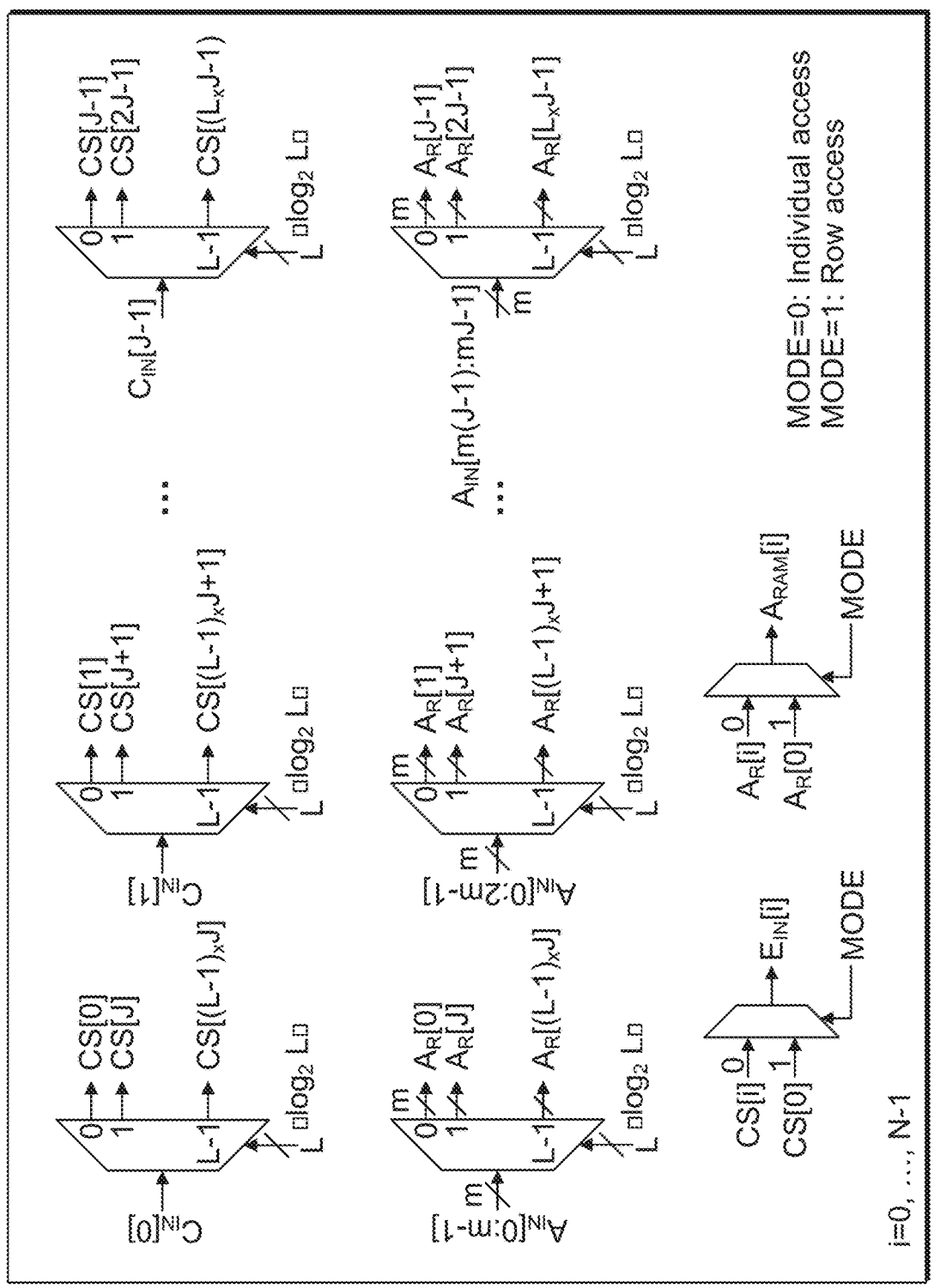
FIG. 11B illustrates a partial view of a custom SRAM architecture for fast transpositions and memory access according to the invention.

The custom SRAM architecture shown in FIG. 11A and FIG. 11B provides for fast transposition and memory access. The architecture allows for full-row—or full-column, i.e., transpose—read/write in a single clock cycle (MODE=1) and individual access to up to J SRAMs in a single clock cycle (MODE=0). The SRAM stores M rows (or columns) of N B'-bit per pixels.

More specifically, the SRAM architecture is customized according to FIG. 12 for different purposes while the SRAM memory configurations allow for maximum accuracy. Orientation refers to each SRAM holding either a full row or column of the image. B denotes the number of bits of the input image, C denotes the number of bits used for the kernel coefficients. In particular, $q_1 = \lceil \log_2 Q \rceil$ and $q_2 = \lceil \log_2 Q2 \rceil$.

Turning back to FIG. 10A and FIG. 10B, the following applies for a single clock cycle: (a) MEM_IN provides a full row of the image, (b) MEM_KER provides the entire row or column filter coefficients, (c) MEM_TEP stores the results of convolution along each row, provides access to a full column of the results, and (d) MEM_OUT, accumulates the final result, adds up to P2+Q2−1 values of the convolved image (in a single clock cycle), and also provides a full row.

Returning to the required resources are $J \cdot (N2 \cdot (B+C+q2) + Q2 \cdot C + A_{ffb}(Q2, B+2C+q2)$ flip-flops, $J \cdot A_{FA}(Q2, B+2C+q2)$ 1-bit full additions, and $J \times Q2$ multipliers, were $A_{ffb}(\cdot), A_{FA}(\cdot)$ grow linearly as mentioned above.

Next, a summary of performance-resource requirements is discussed. Without loss of generality, it is assumed that P2≥P1, Q2≥Q1, and consequently N2≥N1. Furthermore, for the purposes of the analysis, it is assumed full rank: r=Q1, and let $L_R = \lceil P1/J \rceil$ and $L_C = \lceil (P2+Q2-1)/J \rceil$. The total running time is given as the sum of clock cycles required for: (i) row processing: $r \cdot L_R \cdot (J+P2+Q2-1)$, (ii) column processing: $r \cdot L_C \cdot (J+P1+Q1-1)$, and (iii) the latency of the adder tree $\lceil \log_2 Q1 \rceil + 1$. To simplify the derivation, let N=max{P2+Q2−1,P1+Q1−1}. Then, for J=1, the minimum resource usage grows as $0(N)$ with a running time of $0(N^2)$. For J=N, the fastest running time $0(N)$ is provided with resource usage that grows as $0(N^2)$. Again, FIG. 12 illustrates detailed resource usage of the memories. The architecture parameters may be further optimized as described below with respect to Pareto optimal architectures. Detailed comparisons are also discussed below.

Scalability may be achieved for large images using overlap-add. The convolution and cross-correlation kernels tend to be much smaller than the size of the input image. Thus, for much larger images, the best approach is to design the hardware architecture for the smaller kernels. The original image is subdivided into the smaller windows that are equal to the size of the kernel. Convolutions and cross-1-D correlations re computed for each block. Results from neighboring blocks must be added together. Furthermore, the final output is a concatenation of the results from each block. The basic approach is very well understood. Furthermore, the approach can also be parallelized to use multiple hardware blocks.

For purposes of the following discussion, it is assumed that both the image (block) and the convolution/cross-correlation kernel size are of the same size. Furthermore, the most common size is focused upon when both the image (block) and the kernels are square.

According to the invention, the architectures may be Pareto optimal. As mentioned above, it is possible to use J that is sub-optimal, or sub-optimal in the Pareto sense. Essentially, an architecture is Pareto-optimal if it provides the best possible performance for required resources. Thus, a Pareto optimal family of architectures always produces better running time for more resources. To derive the set of Pareto-optimal solutions, recall that the scalable families of architectures may contain less than J rows for the last block of 1-D convolutions. Thus, for FastScaleConv and FastScaleXcross, to fully utilize available hardware resources, the selected J values are required that would satisfy $\langle N+1 \rangle_J = 0$. Similarly, for FastRankConv, the selected J values are required that simultaneously satisfy $\langle P1 \rangle_J = 0$ and $\langle P2+Q2-1 \rangle_J = 0$.

Following is a discussion of extensive comparisons with prior methods to demonstrate the promise of the proposed methods in implementing both convolutions and cross-correlations. The invention is compared to (i) serial systolic arrays ("$S_{ER}S_{YS}$"), (ii) scalable and parallel systolic arrays ("$S_{CA}S_{YS}$"), (iii) sliding windows ("SliWin"), and (iv) parallel and pipelined Fast Fourier Transform radix-2 ("$FFT_R2$").

As described earlier, the proposed architectures can compute both convolutions and cross-correlations. For FastRankConv, flipping the kernel can be done during pre-processing, prior to DVD and LU computations. Following is a presentation of results for FastConv, FastScaleConv, and FastRankConv. It is noted that FastXCorr, FastScaleXCorr, and FastRankXCorr are minor variations of FastConv, FastScaleConv, and FastRankConv.

Implementation setup and alternative methods are now discussed. Convolutions are considered with P×P kernels and image blocks where the output is of size N×N where N=2P−1. For multi-objective comparisons, it is assumed B=8 bits for the input image pixels and C=12 bits for the kernel coefficients. 12-bits for the outputs of the additions, multiplications, and the DPRT are used. For FPGA implementations, C=8 bits for the kernel coefficients and full-precision for the outputs is considered. For the "$FFT_R2$", the computations are performed using 32-bit floating point units. An extension of "$FFT_R2$" is considered using point-to-point multiplications using D 1-D FFT cores. Then, in the fastest possible 2-D implementation, it is assumed that it would take $N^2/D$ additional clock cycles to implement the point to point complex multiplications.

As discussed above, for FastScaleConv, hardware scalability is achieved by varying H, the number of rows processed in parallel for the scalable DPRT, and J, which represents the number of 1-D convolutions computed in parallel. Here, for H=2, 3, . . . , N−1, set J=H for a balanced approach towards both. Then, for H=N, J=N+1 is sued to provide the optimal solution using FastConv. For FastRankConv, r is used to denote the rank of the approximation.

There are some special restrictions on N. For the DPRT based methods, N needs to be prime. For "$FFT_R2$", N is assumed to be a power of 2. For "$S_{CA}S_{YS}$", P needs to be a composite number (N=2P−1), and it is assumed that $P = P_A \cdot P_B$. The results are focused on the cases when $P_A = 2$ (slowest) and $P_B = 4$ (fastest), with an input buffer and fully pipelined additions. It is noted that when $P_B = 2$ the resource usage becomes prohibitive ($0(N^3)$). For "$S_{ER}S_{YS}$", "SliWin" and FastRankConv, there is no restriction for P. When the size needs to be changed, zero-padding is applied.

In addition to providing convolution and cross-correlation architectures that are both fast and scalable, the invention also provides architectures that are optimal in the multi-objective sense. The comprehensive summary in terms of performance and resources is shown in FIG. 9. FIG. 9 lists performance in clock cycles, number of flip-flops, number of 1-bit additions (equivalent full-adders), number and type of multipliers, and SRAM requirements. Additional details for FPGA implementations are discussed below.

Figure 13:
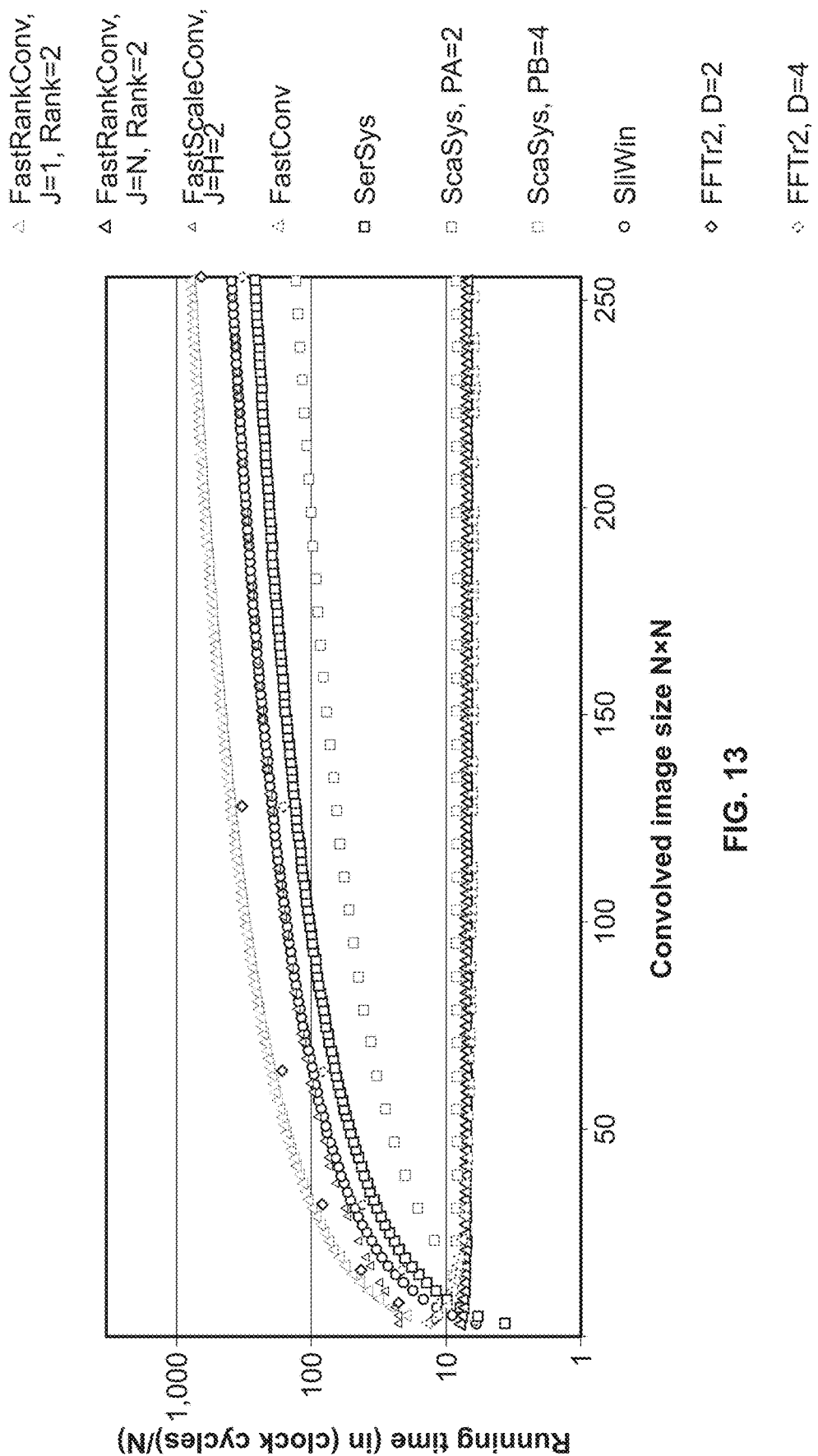
FIG. 13 illustrates a graph of a comparison of normalized execution times including FastRankConv, FastConv, and FastScaleConv according to the invention.

FIG. 13 illustrates a graph of a comparison of normalized execution times according to the invention. As shown in FIG. 13, the required number of clock cycles is divided by N where N=2P−1. To illustrate the range of possibilities, architectures with quadratic and linear time complexity are considered. For quadratic time complexity ($0(N^2)$), scalable implementations are derived by FastScaleConv for J=H=2, and FastRankConv with J=1, r=2. Alternatively, the following are considered: a scalable extension of "$FFT_R2$" for D=2,4, a scalable implementation of "$S_{CA}S_{YS}$", and the non-scalable implementations due to "SliWin" and "$S_{ER}S_{YS}$". FastConv provides the fastest performance at just $6N+5n+17$ clock cycles ($n=\log_2(N)$). For J=N+1, FastScaleConv achieves the same performance as FastConv. For rank=2 approximations to the convolution kernel (J=N), FastRankConv approximates the performance of FastConv. In terms of related research, for $P_B$=4, "$S_{CA}S_{YS}$" achieves linear time-performance as well. On the other hand, from FIG. 9, for linear time performance, using $P_A=P/P_B=P/4$, it can be seen that the requirements for "$S_{CA}S_{YS}$" grow as $P^3$ as opposed to $P^2$ growth for FastConv and FastScaleConv.

It is noted that for very large kernels, as given in FIG. 9, the FFT based methods provide the best results since the N $\log_2(N)$) growth in floating point multipliers and additions likely cost less than the $N^2$ growth of fixed-point multipliers and adders required by FastConv, FastScaleConv, and FastRankConv. As seen in the multi-objective comparisons, FastConv, FastScaleConv, and FastRankConv perform better than "$FFT_R2$" in realistic convolution kernels (e.g., for N=127 and thus for lower N also). As discussed in further detail below, fast implementations of FastConv, FastScaleConv, and FastRankConv can fit in current FPGAs.

Figure 14A:
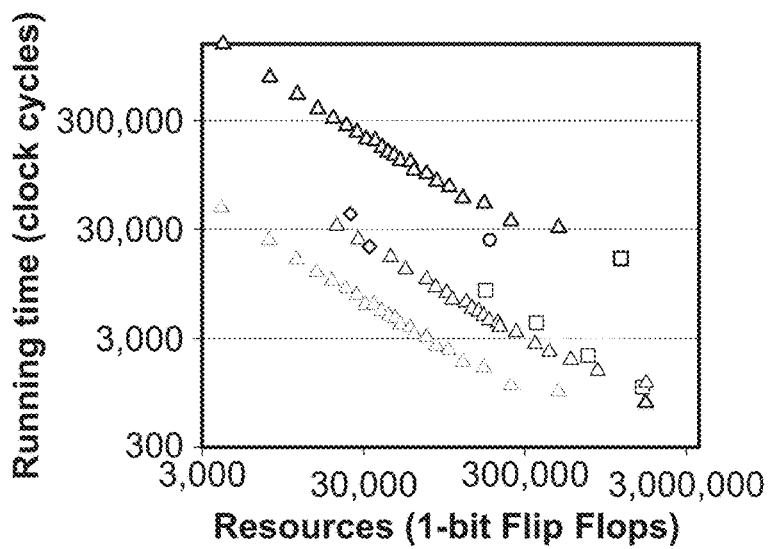
FIG. 14A illustrates a graph of multi-objective comparisons for 1-bit flip flops according to the invention for N=127 for 2-D convolutions between 64×64 blocks.
Figure 14B:
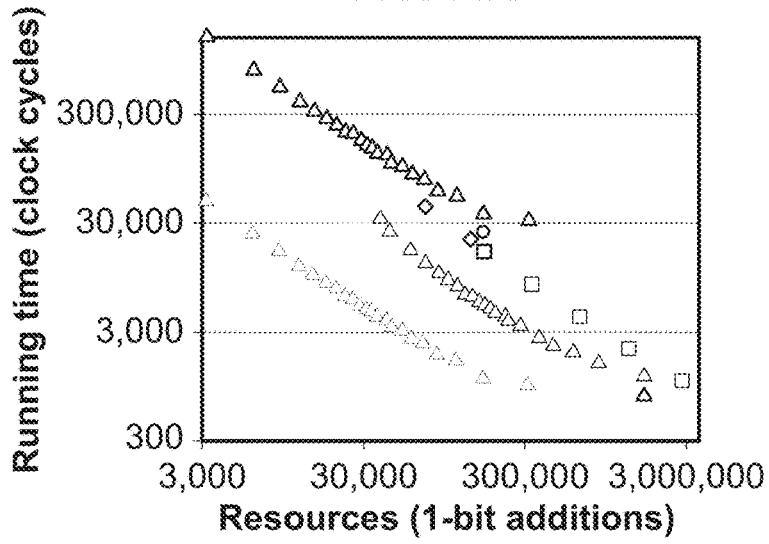
FIG. 14B illustrates a graph of multi-objective comparisons for 1-bit additions according to the invention for N=127 for 2-D convolutions between 64×64 blocks.
Figure 14C:
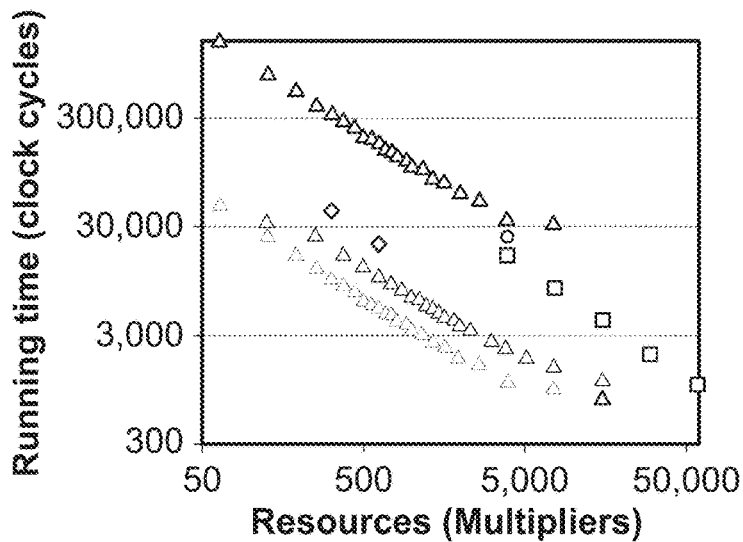
FIG. 14C illustrates a graph of multi-objective comparisons for multipliers according to the invention for N=127 for 2-D convolutions between 64×64 blocks.

FIG. 14A, FIG. 14B, and FIG. 14C illustrate graphs of multi-objective comparisons according to the invention for N=127 (N=128 for $FFT_R2$"). More specifically, the graph of FIG. 14A shows comparisons based for 1-bit flip-flops, the graph of FIG. 14B illustrates equivalent 1-bit additions, and equivalent 12-bit fixed point multipliers are shown in the graphof FIG. 14C (see FIG. 9 for memory usage). To interpret the plots, note that each curve, (termed a Pareto front), represents a family of optimal implementations. The best results come from the Pareto fronts located in the lower-left. Within each Pareto front, the upper left point represents the implementation that requires the largest number of cycles (slowest) with the lowest number of required resources. Then, the lower-right point represents the implementation that requires the smallest number of cycles (fastest) with the maximum number of required resources. To enable more direct comparisons, specific numbers for some of the implementations is listed in FIG. 15.

FIG. 15 illustrates a chart of performance and resource comparisons according to the invention. Convolutions are between 64×64 blocks. For linear time implementations FastConv is the fastest and serves as the reference design. The remaining implementations are normalized by the corresponding resources required by FastConv. Similarly, for quadratic-time implementations, FastScaleConv is used as the reference dsign. Memory requiremens refer to SRAM bits. Also, it is noted that the reported "$FFT_R2$" resources for additions and multiplications refer to an approximation of the equivalent fixed-point resources as described above.

Since they are the fastest, FastConv implementations are always in the lowest right portion in each plot. From FIG. 15, it can be seen that FastConv only requires 25% of the multipliers and memory, and 56% of the addition resources required by "$S_{CA}S_{YS}$", while requiring only 77% of the clock-cycles. In terms of scalable approaches, the Pareto front for FastRankConv (rank=2), provide the best performance with minimum resources. The limited resources required by FastRankConv are also clearly documented in FIG. 15. The full-ranked FastRankConv requires the maximum amounts of resources to deliver the same performance. Consistently, FastScaleConv provides the best scalable implementations without requiring low-rank. As seen from FIG. 15, for the linear case, FastScaleConv is slightly more expensive in resources than FastConv and substantially less expensive than "$S_{CA}S_{YS}$". Overall, "$S_{CA}S_{YS}$" (PB=4) implementations achieve the speed of FastScaleConv but require significantly more multipliers and adders. "$S_{ER}S_{YS}$" and "SliWin" require significantly more resources and are also much slower than FastScaleConv. Returning to FIG. 15, for the quadratic case, FastScaleConv and FastRankConv (rank=2) are the fastest while requiring fewer adders and (equivalent) multipliers. Since only FastConv, FastScaleConv allow the kernel to change in running time, FastConv and FastScaleConv can also be used in cross-correlations with adaptive kernels, and adaptive filterbank applications.

Full-precision FPGA implementations are considered to understand what can be fitted in modern devices. In particular, full-precision implementations for 8-bit inputs and kernels are considered. According to certain embodiments, the invention was implemented using current FPGA technologies, for example, Virtex-7 and Zynq-SOC. For FastScaleConv and FastConv, for different N and J (the number of parallel 1-D convolvers), different implementations are shown in FIG. 16. For FastRankConv, by varying P and J, different implementations are presented in FIG. 17.

As shown, a collection of FastScaleConv architectures are successfully implemented for N=7 to N=127. For N=41, a high-level of parallelism is achieved by computing the DPRT and inverse DPRT by parallel-processing H=32 rows at a time through J=32 1-D full-precision, pipelined convolvers also operating in parallel. According to this example, the output images required 34 bits. For N=37, a full precision implementation of FastConv is provided that only requires 291 clock cycles by parallel processing 38 rows of the DPRT and inverse DPRT, and parallel computing 38 1-D convolutions.

As seen from FIG. 16, implementations are limited by the number of available look-up tables. Thus, the larger values of N can be implemented by reducing the precision requirements. As shown in FIG. 17, FastRankConv makes a very efficient use of the DSPs while not requiring significant LUT resources. As an example, for P=67, FastRankConv only requires 16205 LUTs (out of 712000 LUTs). In comparison, FastScaleConv requirements for N=127 (which approximates 2P−1), requires about 20 times more LUTs to deliver the full-accuracy results. Also for P=67, FastRankConv with rank r=2 requires 48903 clock cycles, compared to 33507 clock cycles for FastScaleConv with J=1 and H=2 without any rank restrictions. Thus, as mentioned above, for low-rank kernels, FastRankConv is a good alternative to FastScaleConv. For higher ranks and general-purpose implementations, FastScaleConv is preferable.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A method for fast and scalable architectures adaptable to available resources, that can be used to compute 2-D convolutions using 1-D convolutions comprising the steps of:
   providing an input image and a 2-D convolution kernel, wherein the input image comprises rows and columns of pixels and is partitioned into blocks and processed using an overlap-and-add approach or an overlap-and-save approach;
   decomposing the 2-D convolution kernel into a sum of separable 1-D kernels;
   applying the 1-D kernels along the rows and then the columns or vice-versa using pipelined 1-D convolvers that compute one output pixel per clock cycle;
   adding up results from the applying step; and
   producing a final image output based on the 2-D convolution kernel.

2. The method according to claim 1, wherein the number of 1-D kernels is 2, one to be applied along the rows and another one to be applied along the columns, wherein the two 1-D kernels can be the same.

3. The method according to claim 1, wherein the number of 1-D kernels is 4, two to be applied along the rows, and the other two to be applied along the columns, wherein some of the 1-D kernels can be the same.

4. The method according to claim 1, wherein the 2-D decomposition of the 2-D convolution kernel and the number of separable 1-D kernels are computed using a combination of singular value decomposition (SVD) and lower-upper (LU) decompositions.

5. The method according to claim 1 further comprising the steps of:
   allowing access, storage or accumulation of the results from a row or a column in a single clock cycle; and
   accessing all or a portion of the results using one or more rows or one or more columns.

6. The method according to claim 1, wherein the number of 1-D kernels is 2, 4, 6, 8, up to maximum number needed to get a perfect reconstruction of the 2-D kernel using SVD, wherein some of the 1-D kernels can be the same.

* * * * *